(12) United States Patent
Pangasa et al.

(10) Patent No.: US 10,437,464 B2
(45) Date of Patent: Oct. 8, 2019

(54) CONTENT FILTERING SYSTEM FOR TOUCHSCREEN DEVICES

(71) Applicant: Adobe Inc., San Jose, CA (US)

(72) Inventors: Ankit Pangasa, Delhi (IN); Akhil Chugh, New Delhi (IN)

(73) Assignee: Adobe Inc., San Jose, CA (US)

( * ) Notice: Subject to any disclaimer, the term of this patent is extended or adjusted under 35 U.S.C. 154(b) by 201 days.

(21) Appl. No.: 15/355,232

(22) Filed: Nov. 18, 2016

(65) Prior Publication Data

US 2018/0143758 A1 May 24, 2018

(51) Int. Cl.

| | |
|---|---|
| G06F 3/0488 | (2013.01) |
| G06F 17/24 | (2006.01) |
| G06F 17/21 | (2006.01) |
| G06F 3/0482 | (2013.01) |
| G06F 16/25 | (2019.01) |
| G06F 16/93 | (2019.01) |
| G06F 16/9535 | (2019.01) |
| G06F 17/22 | (2006.01) |
| G06F 3/0483 | (2013.01) |

(52) U.S. Cl.
CPC ........ G06F 3/04883 (2013.01); G06F 3/0482 (2013.01); G06F 3/0483 (2013.01); G06F 16/25 (2019.01); G06F 16/93 (2019.01); G06F 16/9535 (2019.01); G06F 17/211 (2013.01); G06F 17/218 (2013.01); G06F 17/2229 (2013.01); G06F 17/243 (2013.01)

(58) Field of Classification Search
None
See application file for complete search history.

(56) References Cited

U.S. PATENT DOCUMENTS 9,081,810 B1 *  7/2015  Smith ............... G06F 17/30386
9,607,289 B2 *  3/2017  Matas ............... G06F 17/30867
(Continued)

FOREIGN PATENT DOCUMENTS

WO  PCT/CN2015/098228  * 12/2015

OTHER PUBLICATIONS

John Walkenbach, Excel 2007 Bible, Jan. 3, 2007, John Wiley and Sons, pp. 1-8 (Year: 2007).*

*Primary Examiner* — Howard Cortes
(74) *Attorney, Agent, or Firm* — Kilpatrick Townsend & Stockton LLP

(57) ABSTRACT

In some aspects, a touch signal corresponding to contact of the user device touchscreen by a user of a user device is received from a touchscreen sensor of the user device. A location of the user's contact and a document object, which is included within a document displayed on the touchscreen at the location of the user's contact, are determined. An object type corresponding to the document object is determined, and a set of document objects, which are also included in the document, having object types matching the determined object type are identified. A filtered user interface is generated that includes the set of document objects. The set of document objects is extracted from a larger set of document objects. The larger set of document objects includes certain objects with object types that do not match the determined object type. These non-matching objects are excluded from the user interface.

20 Claims, 8 Drawing Sheets

(56) References Cited

U.S. PATENT DOCUMENTS

| | | | |
|---|---|---|---|
| 2004/0196267 A1* | 10/2004 | Kawai | G06F 3/04842 345/173 |
| 2005/0046621 A1* | 3/2005 | Kaikuranta | G06F 3/03547 345/173 |
| 2005/0050088 A1* | 3/2005 | Kotler | G06F 17/245 |
| 2005/0073506 A1* | 4/2005 | Durso | E05B 73/0082 345/173 |
| 2005/0168449 A1* | 8/2005 | Katayose | G06F 3/016 345/173 |
| 2008/0307362 A1* | 12/2008 | Chaudhri | G06F 3/0481 715/835 |
| 2012/0023449 A1* | 1/2012 | Zabielski | G06F 17/246 715/825 |
| 2012/0306766 A1* | 12/2012 | Moore | G06F 3/04883 345/173 |
| 2013/0342544 A1* | 12/2013 | Winberg | G06F 3/0481 345/473 |
| 2014/0137012 A1* | 5/2014 | Matas | G06Q 10/10 715/764 |
| 2014/0165000 A1* | 6/2014 | Fleizach | H04M 19/04 715/810 |
| 2014/0240352 A1* | 8/2014 | Kuncl | G06T 11/00 345/633 |
| 2015/0001293 A1* | 1/2015 | Vargas | G06K 17/0022 235/385 |
| 2015/0215245 A1* | 7/2015 | Carlson | G06F 3/04883 715/752 |
| 2015/0309704 A1* | 10/2015 | Bae | G06F 1/1677 715/765 |
| 2015/0370409 A1* | 12/2015 | Kritt | G06F 3/0418 345/178 |
| 2016/0070432 A1* | 3/2016 | Caporal | G06F 3/0482 715/767 |
| 2017/0169800 A1* | 6/2017 | Greco | G06F 12/0866 |
| 2018/0188911 A1* | 7/2018 | Wang | G06F 3/0488 |

* cited by examiner

CONTENT FILTERING SYSTEM FOR TOUCHSCREEN DEVICES

TECHNICAL FIELD

This disclosure relates generally to computer-implemented methods and systems for touchscreen devices and more particularly relates to using touchscreen input to filter content displayed on a touchscreen interface.

BACKGROUND

The physical size of computing devices is steadily decreasing as technological advancements reduce the amount of physical space required by integrated circuitry of computing devices. The proliferation of touchscreen technology into these computing devices provides further decreases in device size. For example, in touchscreen devices, the function of certain device hardware (e.g., keyboards, trackpads, and other input and selection tools) is integrated into the software capabilities associated with a touchscreen. Many mobile devices now forego the use of a physical keyboard and instead rely on touchscreen keyboards displayed on a display unit of the computing devices to allow for user input.

With the reduced size of computing devices, it is increasingly difficult to maintain the legibility of documents, such as webpages, portable document format (PDF) files, and spreadsheets on a display unit. Similarly, selectable objects (e.g., form fields, hyperlinks, and editable images) in documents are difficult to select using a touchscreen device, particularly when a document is cluttered with different types of objects in close proximity. For example, a user may desire to select a form field on a form document displayed on the touchscreen, but accidentally select a hyperlink located below the form field, causing the user device to navigate away from the form document to a file corresponding to the hyperlink.

Such inadvertent selections may be frustrating and detract from the intent of the touchscreen device to provide comparable ease-of-use as larger devices having corresponding hardware input tools. The issue is compounded by the fact that a selection of a form field will often cause the touchscreen keyboard to be displayed on the touchscreen, further limiting the available screen space for displaying the document. While some touchscreen devices offer zooming, panning, and other functionalities to aid in preventing inadvertent selections by a user (e.g., enlarging a desired object on the touchscreen to allow for an easier selection of the object), the additional action further detracts from the ease-of-use of the devices.

SUMMARY

Certain aspects of the present disclosure involve filtering document objects from a document displayed on a touchscreen of a user device. In one such aspect, a computer-implemented method includes receiving, from a touchscreen sensor, an electronic touch signal corresponding to contact of the touchscreen by a user of a user device, the touch signal including information associated with the contact. The method also includes determining, by a processor communicatively coupled to the touchscreen sensor, a location of the contact on the touchscreen. The method also includes identifying, by the processor, a document object that is displayed at the location and within a document displayed on the touchscreen. The method also includes determining, by the processor, an object type corresponding to the document object. The method also includes identifying, by the processor, a first set of document objects within the document, each object of the first set of document objects including a corresponding object type that matches the determined object type. The method also includes generating, by the processor, a filtered user interface by extracting the first set of document objects from a second set of document objects, the second set of document objects including additional objects with object types that do not match the determined, wherein the filtered user interface excludes the additional objects and is displayable on the touchscreen.

In additional aspects of the present disclosure, the filtered user interface is generated subsequent to a determination that the contact corresponds to a triggering event. For example, the triggering event may correspond to a pressure associated with the contact. A determination that the pressure is above a pressure threshold value causes the filtered user interface to be generated. In another example, the triggering event may correspond to a touch pattern corresponding to a number of successive user contacts with the touchscreen or a pattern of successive user contacts. Pressure corresponding to a user's touch is compared to the touch pattern to determine whether to generate the filtered user interface.

These illustrative features are mentioned not to limit or define the disclosure, but to provide examples to aid understanding thereof. Additional aspects are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
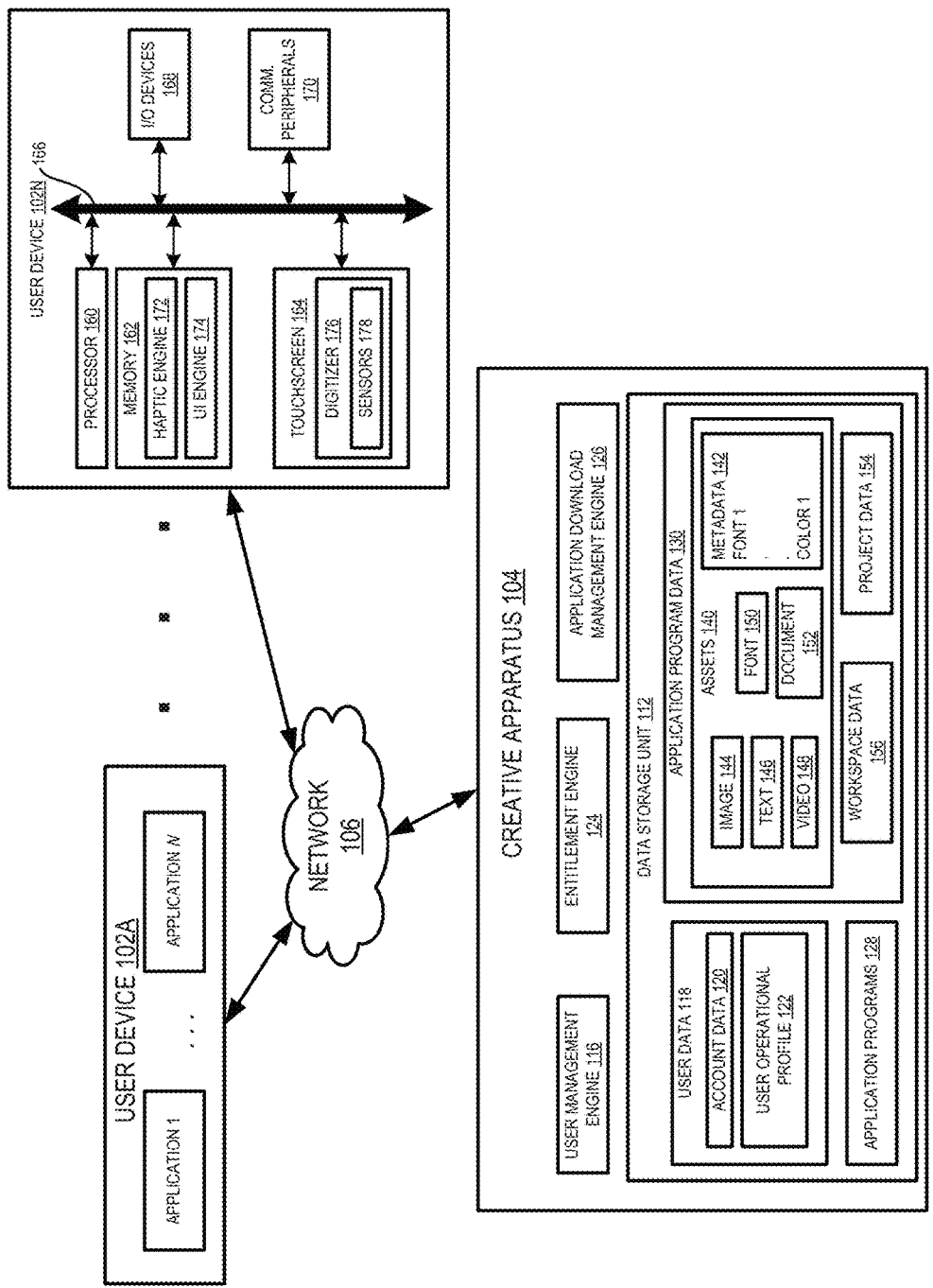
FIG. 1 is a block diagram depicting an example of a network environment for filtering document content displayed on a user device according to an aspect of the present disclosure.

Certain aspects involve generating a filtered user interface that is displayable on a touchscreen of a user device. The filtered user interface includes a subset of objects from a document and is overlaid on a display of the document on the touchscreen. In some aspects, the filtered user interface is generated in response to a user touching the touchscreen in a specific manner. The triggering touch causes a content filtering system of the user device to identify, in a document displayed on the touchscreen, an object corresponding to the user's touch (e.g., the object displayed on the touchscreen at the location the user touched). The content filtering system generates a separate user interface including certain objects from the document that have the same object type as the touched object and, in some aspects, excluding objects having a different object type.

In one example, a form document including text (e.g., instructions for completing the form) and user input options (e.g., entry fields and their descriptors) is displayed on the touchscreen of a user device. A triggering touch to actuate a content filtering system includes the user touching the touchscreen of the user device with an amount of pressure that is above a predetermined threshold. The touch location may correspond to one of the user input options (e.g., an entry field for the user to enter an address). The triggering touch causes the system to identify a set of user input options and to generate a user interface that includes a subset of the user input options, where some options from the full set of user options are excluded from the generated user interface. The user may touch or otherwise select the input option to provide input into the entry field in the same manner as the user would do so in the original document. For example, the user may touch the input option for which the user desires to provide input by touching the input option with a pressure below the threshold pressure for actuating the system.

In some aspects, the user input options included on the filtered user interface retain the input format of the corresponding input options on the original document. For example, the user input options may include an alphanumeric input option (e.g., an entry field in which the user enters an alphanumeric input using a keyboard) and a drop-down box input option (e.g., an entry field in which the user selects an input from a drop-down menu of options). The corresponding user input options in the filtered user interface also include the alphanumeric input option and the drop-down box input option, respectively. In additional or alternative aspects, the input options also include an input option descriptor. The input option descriptor corresponds to the description or title associated with each input option (e.g., the description "Address:" for an input option requesting an address). Accordingly, the filtered user interface retains the input option descriptors corresponding to each user input option included on the filtered user interface.

A user device configured to filter select object types according to aspects of the present disclosure provides several advantages over current user devices. For instance, the expanded use of the touchscreen capabilities enhances the ability of the user to navigate through documents displayed on the user device. The touchscreen capabilities provide a user-friendly method of navigating through various types of documents displayed on the user device. Through a single step of touching the user device's touchscreen, the user can quickly have access to a summarized view of desired content within the document. Similarly, the filtering techniques reduce the impact of the physical size of the display screen of the user device to affect the usability of the user device. For example, a filtered user interface according to aspects of the present disclosure can present relevant data to the user in an optimized manner in the limited available space of the display screen. Thus, the overall size of the user device can be smaller without affecting the user's ability to operate the user device.

Aspects of the present disclosure are adaptable to any text-based document, including, but not limited to, portable document format (PDF) documents, Word® documents (e.g., DocX), Excel® documents (e.g., XLSX), PowerPoint® documents (e.g., PPTX), rich text format (RTF) documents, and webpages (e.g., HTML). Similarly, the use of the touchscreen capabilities allows easy adoption of aspects of the present disclosure on various operating systems, including, but not limited to iOS®, Android®, Windows®, and Cyanogen®.

Turning now to the drawings, FIG. 1 is a diagram of a network environment 100 in which one or more aspects of the present disclosure can be practiced. The environment 100 includes user devices, such as user devices 102A-102N. Each of the user devices is connected to a creative apparatus 104 via a network 106. A user of the user devices uses various products, applications, or services supported by the creative apparatus 104 via the network 106.

The user device corresponds to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. Digital tools include the creative apparatus 104. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a tablet computer, a mobile device, a processing unit, any combination of these devices, or any other suitable device having one or more processors and touchscreen functionality. Each user device includes at least one application supported by the creative apparatus 104. It is to be appreciated that following description is now explained using the user device 102N as an example and any other user device can be used. Examples of the network 106 include, but are not limited to, internet, local area network (LAN), wireless area network, wired area network, wide area network, and the like.

The creative apparatus 104 includes one or more engines for providing one or more digital experiences to the user. The creative apparatus 104 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 104 also includes a data storage unit 112. The data storage unit 112 can be implemented as one or more databases or one or more data servers. The data storage unit 112 includes data that is used by the engines of the creative apparatus 104.

A user of the user device 102N visits a webpage or an application store to explore applications supported by the creative apparatus 104. The creative apparatus 104 provides the applications as a software as a service (SaaS), or as a standalone application that can be installed on the user device 102N, or as a combination. The user creates an account with the creative apparatus 104 by providing user details and by creating login details. Alternatively, the creative apparatus 104 can automatically create login details for the user in response to receipt of the user details. In some aspects, the user is also prompted to install an application manager. The application manager enables the user to manage installation of various applications supported by the creative apparatus 104 and to manage other functionalities, such as updates, subscription account and the like, associated with the applications. The user details are received by a user management engine 116 and stored as user data 118 in the data storage unit 112. In some aspects, the user data 118 further includes account data 120 under which the user details are stored.

The user either can opt for a trial account or can make payment based on type of account or subscription chosen by the user. Alternatively, the payment can be based on product or number of products chosen by the user. Based on payment details of the user, a user operational profile 122 is generated by an entitlement engine 124. The user operational profile 122 is stored in the data storage unit 112 and indicates entitlement of the user to various products or services. The user operational profile 122 also indicates type of user, i.e. free, trial, student, discounted, or paid. In some aspects, the user management engine 116 and the entitlement engine 124 can be one single engine performing the functionalities of both the engines.

The user then installs various applications supported by the creative apparatus 104 via an application download management engine 126. Application installers or application programs 128 present in the data storage unit 112 are fetched by the application download management engine 126 and made available to the user directly or via the application manager. In one aspect, all application programs 128 are fetched and provided to the user via an interface of the application manager. In another aspect, application programs 128 for which the user is eligible based on user's operational profile are displayed to the user. The user then selects the application programs 128 or the applications that the user wants to download. The application programs 128 are then downloaded on the user device 102N by the application manager via the application download management engine 126. Corresponding data regarding the download is also updated in the user operational profile 122. An application program 128 is an example of the digital tool. The application download management engine 126 also manages a process of providing updates to the user device 102A.

Upon download, installation and launching of an application program, in one aspect, the user is asked to provide the login details. A check is again made by the user management engine 116 and the entitlement engine 124 to ensure that the user is entitled to use the application program. In another aspect, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 112 by a synchronization engine 132. The application program data 130 can be specific to the user or can be shared with other users based on rights management.

The application program data 130 includes one or more assets 140. The assets 140 can be a shared asset which the user wants to share with other users or which the user wants to offer on a marketplace. The assets 140 can also be shared across multiple application programs 128. Each asset includes metadata 142. Examples of the metadata 142 include, but are not limited to, font, color, size, shape, coordinate, a combination of any of these, and the like. In addition, in one aspect, each asset also includes a file. Examples of the file include, but are not limited to, an image 144, text 146, a video 148, a font 150, a document 152, a combination of any of these, and the like. In another aspect, an asset only includes the metadata 142. The application program data 130 also include project data 154 and workspace data 156. In one aspect, the project data 154 includes the assets 140. In another aspect, the assets 140 are standalone assets. Similarly, the workspace data 156 can be part of the project data 154 in one aspect while it may be standalone data in other aspect.

Through an application corresponding to the creative apparatus 104, the user may receive a document 152 from the creative apparatus 104 via the network. For example, the user may receive and view the document 152 on the user device 102N. The user device 102N includes at least a processor 160, a memory 162, and a touchscreen 164. In some aspects, the processor 160 may include a single processing device. In other aspects, the processor 160 may represent multiple processing devices. An interface bus 166 is configured to communicate, transmit, and transfer data, controls, and commands among the processor 160, the memory 162, the touchscreen 164, and other various components of the user device 102N. The memory 162 includes computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. For example, the instructions include haptic engine 172 and user interface engine 174, each including one or more algorithms executable by the processor 160. The haptic engine 172 includes algorithms or other instructions to cause the processor 160 to analyze interactions between a user and the touchscreen 164 (e.g., the user tapping, pressing, swiping, or otherwise contacting the touchscreen 164 of the user device 102N). The haptic engine 172 receives electrical signals from the touchscreen 164 corresponding to the user's contact with the touchscreen 164. The haptic engine 172 analyzes the electrical signals to determine an amount of pressure applied to the surface of the touchscreen 164 by the user's contact. The haptic engine 172 also analyzes the electrical signals to determine a location of the user's contact with the touchscreen 164. The user interface engine 174 includes algorithms or other instructions to cause the processor 160 to generate one or a series of user interfaces that are displayed on the touchscreen 164. The user interfaces may correspond to one of the applications 1-N (e.g., a web page on an Internet browser application; an application associated with the creative apparatus 104 for editing images, etc.). In some aspects, the haptic engine 172 and the user interface engine 174 may operate together to allow the processor 160 to determine an object within a user interface displayed on the touchscreen 164 that corresponds to the location of the user's contact with the touchscreen 164.

The memory 162 also includes computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the user device 102N Further, the memory 162 includes an operating system, programs, and applications 1-N. The processor 160 is configured to execute the stored instructions and includes, for example, a logical processing unit, a microprocessor, a digital signal processor, and other processors. The memory 162 or the processor 160, or both, can be virtualized and can be hosted within another computing system of, for example, a cloud network or a datacenter. Input and output peripherals 168 may also be included in the user device 102N and include user interfaces such as an external keyboard, microphone, speaker, other input/output devices, and computing components such as graphical processing units, serial ports, parallel ports, universal serial bus, and other input/output peripherals. The input/output peripherals 168 are connected to the processor 160 through any of the ports coupled to the interface bus 166. The communication peripherals 170 are configured to facilitate communication between the user device 102N and other computing devices over the network 106 and include, for example, a network interface controller, modem, wireless and wired interface cards, antenna, and other communication peripherals.

The touchscreen 164 includes a digitizer 176. The digitizer 176 includes one or more devices to convert the electrical signals generated by the user's touch of the touchscreen 164 into digital signals usable by the haptic engine 172. In some aspects, the digitizer 176 includes a glass material positioned adjacent to an LCD display of the user device 102N. The digitizer 176 includes one or more sensors 178 embedded in the material to sense the user's contact with the touchscreen 164. In some aspects, the sensors 178 are resistive sensors that sense bends in the touchscreen 164 corresponding to the user's contact. In additional and alternative aspects, the sensors 178 are capacitive sensors that sense charges generated by the user's contact with the touchscreen 164. In one example, the capacitive sensors measure microscopic changes in the distance between a backlight and cover glass of the touchscreen 164. This information may be combined with other sensors 178 (e.g., other resistive or capacitive touch sensors) to provide pressure-sensitive capabilities of the touchscreen 164 to allow the amount of pressure applied by the user's touch to be determined.

Triggering Event Based on a User's Contact

Figure 2:
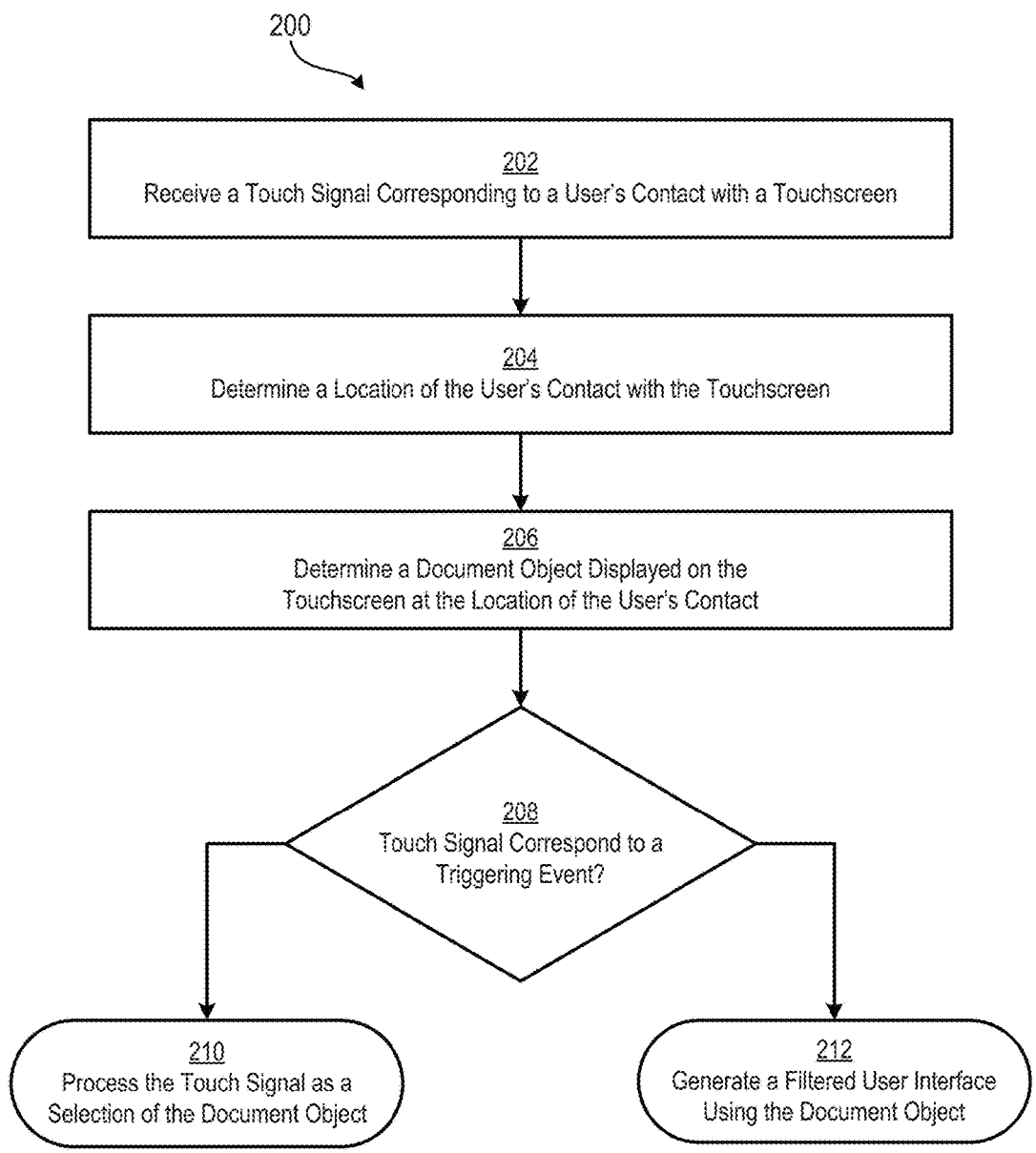
FIG. 2 is a flow chart depicting an example of a process for determining whether a user's touch corresponds to a triggering event for filtering document content displayed on a user device according to an aspect of the present disclosure.

FIG. 2 is a flow chart of an example of a process 200 for determining whether a user's touch corresponds to a triggering event for filtering document content displayed on a user device according to an aspect of the present disclosure. The process 200 is described with respect to the user device 102N of FIG. 1, though other implementations are possible without departing from the scope of the present disclosure.

In block 202, a touch signal is received. In some aspects, the touch signal is an electrical signal corresponding to the user's contact with the touchscreen 164. In some examples, the touch signal is generated by the sensors 178. The touch signal is received by the processor 160 of the user device 102N.

In block 204, a location of the user's contact with the touchscreen 164 is determined. In some aspects, the processor 160 may execute the haptic engine 172 to determine the location of the user's contact. The location may be determined based on the touch signal received from the signals. In one example, touch signal corresponds to a voltage drop across the touchscreen 164 and the location of the voltage drop indicates the location of the user's contact with the touchscreen 164. In another example, the user's contact with touchscreen 164 draws current from electrical fields flowing through portions of the touchscreen 164 (e.g., electrical fields positioned at corners of the touchscreen 164). A ratio of the currents drawn by the user's contact from each of the electric fields may be used to determine the touch location.

In block 206, a document object displayed on the touchscreen 164 may be determined at the location of the user's contact. For example, an application 1-N may cause the processor 160 to display a user interface including a document 152 transmitted from the creative apparatus 104. The document 152 may include multiple objects corresponding to different portions of the document. In one example, the document 152 includes multiple objects corresponding to different images 144 and additional objects corresponding to different text 146. In one example, the user interface engine 174 determines a location of each object in the document 152 based on algorithms, such as hypertext markup language (HTML) or Extensible Markup Language (XML), defining the format of the document 152. The haptic engine 172 or other instructions stored in the memory 162 compares the location of the user's contact with the format of the document 152 to determine which object is positioned at the location of the user's contact with the touchscreen 164.

In block 208, correspondence between the touch signal generated by the user's contact with the touchscreen 164 and a triggering event is determined. The triggering event may correspond to a predetermined manner that the touchscreen 164 is contacted by the user to trigger the processor 160 of the user device 102N to generate a summarized user interface according to aspects of the present disclosure. In some aspects, the triggering event is stored in the memory 162 of the user device 102N. The user's contact with the touchscreen 164 is compared to the stored triggering event to determine correspondence (e.g., a match between the user's contact and the stored triggering event). In one example, the triggering event corresponds to a pressure threshold. The pressure threshold may include an amount of threshold that must be applied to the touchscreen 164 to cause the processor 160 to generate the filtered user interface. The pressure threshold includes a value in which a pressure sensed below the pressure threshold will be treated as a normal user touch. A pressure sensed at or above the threshold may trigger the processor 160 to generate the filtered user interface. The pressure corresponding to the user's contact is determined by the sensors 178. The value of the pressure may be measured in any suitable unit of measurement (e.g., Pascal, pounds per square inch, etc.).

In another example, the triggering event corresponds to a touch pattern associated with the user's contact with the touchscreen 164. Non-limiting examples of a touch pattern include a swipe (e.g., a user finger contacting the touchscreen 164 with a finger in a first location and dragging the finger across the touchscreen 164 to a different location before removing contact), a predetermined number of taps (e.g., three successive taps on the touchscreen 164 at a location), and a predetermined rhythm of taps (e.g., a long tap and a quick tap in succession).

In block 210, in response to determining that the touch signal does not correspond to a triggering event, the touch signal is processed by the processor 160 as a selection of the document object determined in block 206. In some aspects, during normal operation of the user device 102N, a user's contact with the touchscreen 164 is processed as a selection of the object positioned on the document 152 at the location of the user's contact. For example, a user's contact at a location corresponding to a hyperlink positioned on the document 152 is interpreted as a user selection of the hyperlink and triggers the processor 160 to launch a file (e.g., a video 148 or another document 152).

In block 212, in response to determining that the touch signal corresponds to the triggering event, a filtered user interface is generated. In some aspects, the filtered user interface includes the objects within the document 152 having the same object type as the document object displayed on the touchscreen 164 at the location corresponding to the user's contact with the touchscreen 164. Documents having a different object type may be filtered out and not included on the filtered user interface.

Generating a Filtered User Interface

Figure 3:
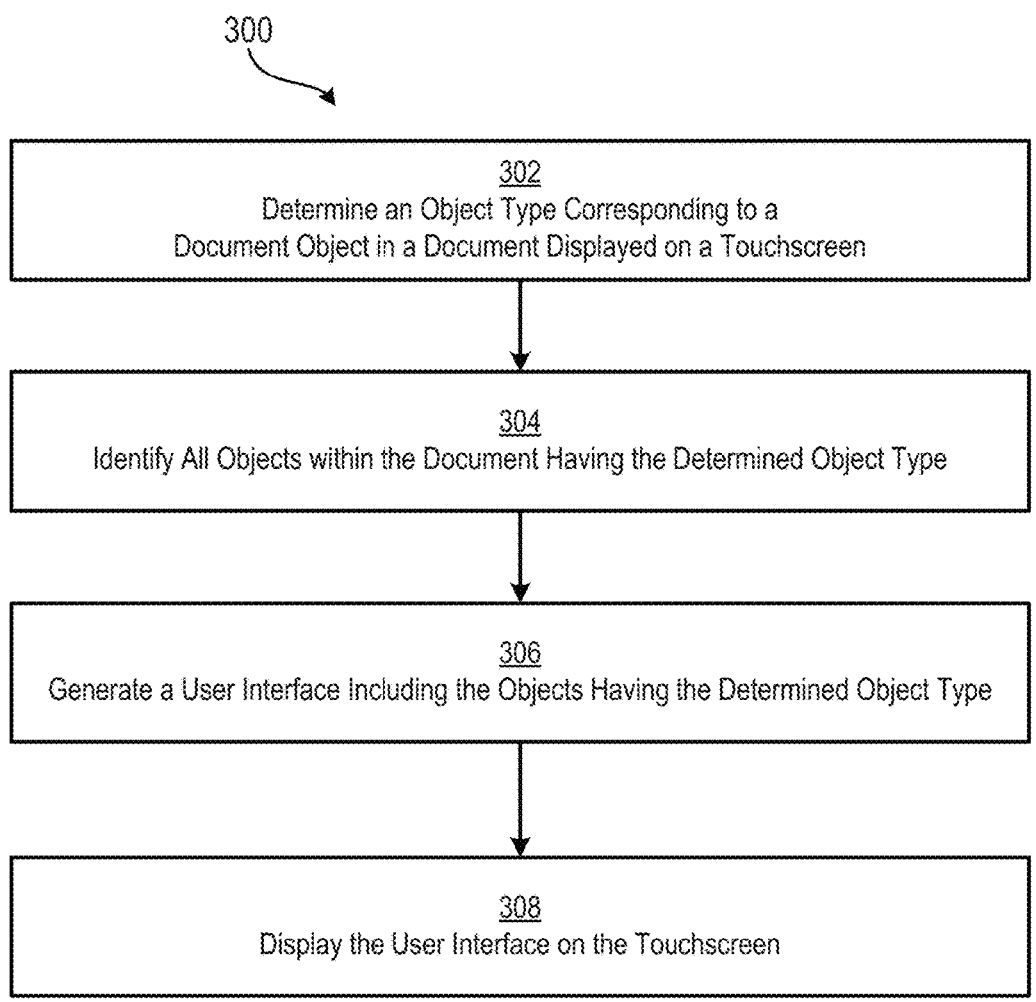
FIG. 3 is a flow chart depicting an example of a process for filtering document objects to generate a filtered user interface according to an aspect of the present disclosure.

FIG. 3 is a flow chart of an example of a process 300 for filtering document objects to generate a filtered user interface according to an aspect of the present disclosure. The process 300 is described with respect to the user device 102N of FIG. 1, though other implementations are possible without departing from the scope of the present disclosure.

In block 302, an object type corresponding to a document object in a document 152 displayed on the touchscreen 164 is determined. The document object corresponds to an object within the document 152 that is positioned at the location of the user's contact with the touchscreen 164 as described in block 206 of FIG. 2. In some aspects, object types include images, text, form entry fields, annotations, and other types of objects included in a document 152 displayable on the touchscreen 164. In additional aspects, each document object may be stored in the data storage unit 112 with a type identifier or other tag corresponding to the object type. For example, the document 152 includes a markup language, such as XML, embedded or otherwise included in the document 152 that defines the formatting of the document 152. The processor 160 analyzes the document 152 based on the markup language to determine how to process the objects in the document 152. Objects of the same type may have a similar or matching tag (e.g., an XML tag) that is usable to identify the object type associated with the object. For example, a form entry field includes a tag labeled "Form XObject" indicating the object is a form. In some aspects, the title or descriptor for the entry field (e.g., the text "Name" corresponding to an entry field for the user to input a name) may have the tag to distinguish the description from other text in the document 152.

In some aspects, the object identifier includes a start-tag and an end-tag surrounding an object. For example, text in the document 152 is tagged as follows:

<section>Hello world.</section>, where the tag "<section>" is a start-tag indicating the start of the text object and the tag "</section>" is an end-tag indicating the end of the text object. In further aspects, the object identifier includes an empty-element tag. For example, the document 152 includes images corresponding to files "image1.gif" and "image 2.gif." Tagging of the objects includes the following:

<img src="image1.gif"/>
<img src="image2.gif"/>, where "img" identifies the objects "image1.gif" and "image2.gif" as images. Although XML tagging convention is described herein, the documents 152 may have any tagging convention for identifying and distinguishing between different object types without departing from the scope of the present disclosure.

In block 304, all objects with in the document having the determined object type are identified. Returning to the example of the document 152 including images corresponding to files "image1.gif" and "image2.gif," the user contacts the touchscreen 164 at the location where the image1 (e.g., the image corresponding to the file "image1.gif") is displayed. The processor 160 identifies all objects having a similar or matching tag (e.g., "img") and identifies image 2 (e.g., the image corresponding to the file "image2.gif").

In block 306, a user interface is generated including the objects determined to have the same object type as described in block 304. In some aspects, the user interface engine 174 generates the user interface by filtering the objects within the document 152 to include only objects having the same object type as the object type determine in block 302. For example, the filtered user interface includes only images where the object type corresponds to object type of the image displayed on the touchscreen at the location of the user's contact. The images are extracted from the document and included in the filtered user interface. The remaining images having different object types are filtered out (e.g., not included in the user interface). In additional and alternative aspects, the objects included in the filtered user interface maintain the properties or characteristics of the corresponding objects in the document 152 displayed on the touchscreen 164. For example, an object in the document 152 corresponding to a form entry field may, when selected by a user, cause the processor 160 to display a touchscreen keyboard that allows the user to input alphanumeric text into the entry field. Similarly, the corresponding form entry field included in the filtered user interface, when selected by the user, will cause the processor 160 to display the touchscreen keyboard for inputting alphanumeric text. In another example, an object in the document 152 corresponding to an image may, when selected by a user, cause the processor 160 to display selection options to allow a user to change, modify, delete, replace, or otherwise edit the image. Similarly, the corresponding image included in the filtered user interface, when selected by the user, will cause the processor 160 to display the same selection options for editing the image.

In block 308, the filtered user interface generated in block 306 is displayed on the touchscreen 164. In some aspects, the filtered user interface replaces the document 152 on the touchscreen 164. In other aspects, the filtered user interface is overlaid on the document 152 such that portions of the document 152 remain visible on the touchscreen 164. The modifications to the objects included on the filtered user interface (e.g., entering text into a form entry field, editing an image) may be reflected on the document 152 upon the user selecting to return to the document. For example, the user may indicate a desire to return to the document 152 from the filtered user interface by pressing a button on the user device 102N or by selecting (e.g., contacting the touchscreen 164) an area of the document 152 that is visible on the touchscreen 164 beyond the boundaries of the filtered user interface. Upon returning to the document 152, the user's actions with respect to the objects in the filtered user interface are shown in the document 152 (e.g., the corresponding entry field includes the text entered by the user from the filtered user interface).

FIGS. 4-8 illustrate examples of documents 152 and filtered user interfaces that are displayed on the touchscreen 164 according to aspects of the present disclosure.

Figure 4:
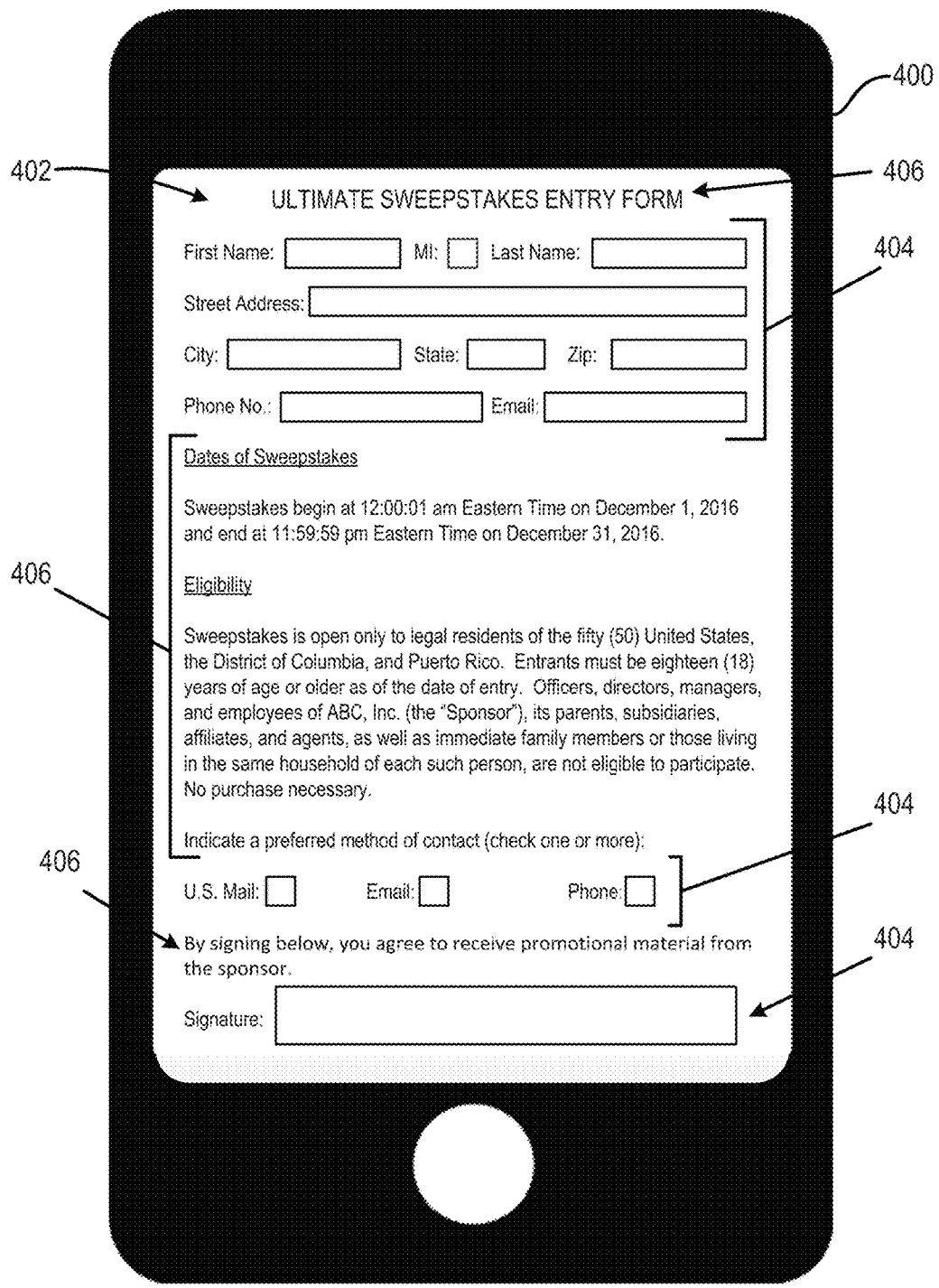
FIG. 4 is an example diagram of a user device including a touchscreen displaying a form document according to an aspect of the present disclosure.

FIG. 4 shows a user device 400. In some aspects, the user device 400 corresponds to one of the user devices 102A-102N of FIG. 1. A document 402 is displayed on a touchscreen of the user device 400. The document 402 includes form objects 404 and text objects 406. In one example, a user of the user device 400 contacts the touchscreen at the location of a form object 404 on the document 402. The user contacts the touchscreen with an amount of pressure beyond the pressure threshold described in block 208 to trigger the processor 160 to generate a filtered user interface. The processor 160 generates the filtered user interface to include only the objects having the same type (e.g., the form objects 404).

Figure 5:
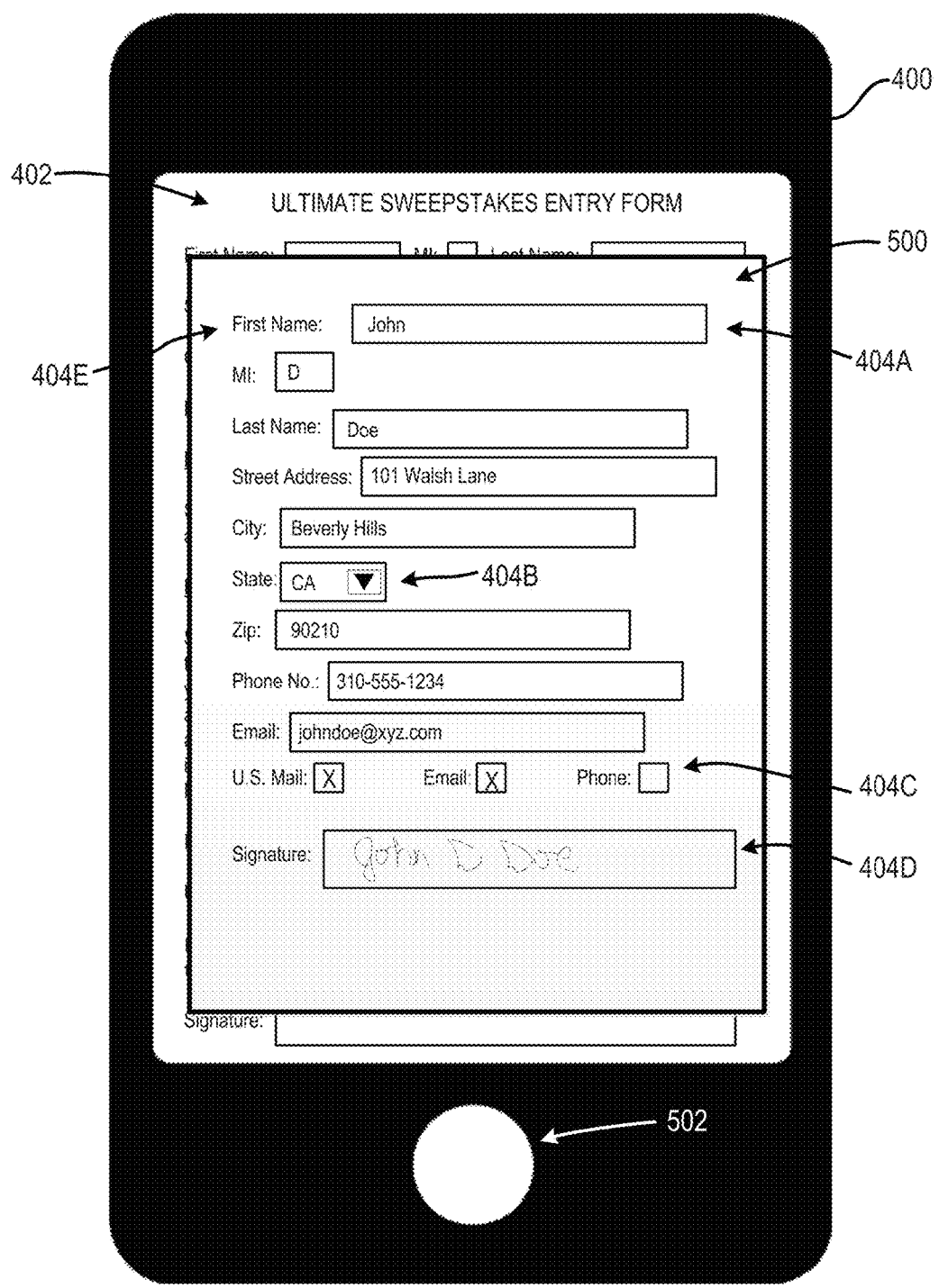
FIG. 5 is an example diagram of a user device including a touchscreen displaying a filtered user interface with document objects from a form document according to an aspect of the present disclosure.

FIG. 5 shows a filtered user interface 500 including only the form objects 404 of FIG. 4. The form objects 404 each include a type similar to or matching the type "form" corresponding to the selected form object 404 on the document 402 of FIG. 4. The form objects include characteristics or properties indicating how the user inputs responses into the form objects 404. The characteristics correspond to the characteristics of the form objects 404 on the document 152. For example, the form objects 404 on the filtered user interface 500 include alphanumeric input options 404A, drop-down menu input option 404B, checkbox input options 404C, and canvas input option 404D. The alphanumeric input options cause the processor 160 to display a touchscreen keyboard on the touchscreen 164 on which the user can input alphanumeric text into the entry field. The drop-down menu input option 404B causes the processor 160 to display a menu including a list of available responses from which the user can select. The selected response is included in the entry field (e.g. "CA" for a selection of the state California). The checkbox input options 404C cause the processor 160 to display an "X" or other selection indicator (e.g., a checkmark) in the entry field to indicate a selection. The canvas input option 404D causes the processor 160 to display a canvas field on which the user can draw a freeform image (e.g., a signature) to display in the entry field. The form objects also include entry field descriptors 404E corresponding to each input option 404A-404D. Upon completing the user input into the various form objects 404, the user selects a button 502 of the user device 400 to cause the processor 160 to return to the document 152. In some aspects, instead of selecting the button 502, the user can select a visible portion of the document 152 to return to the document 152.

Figure 6:
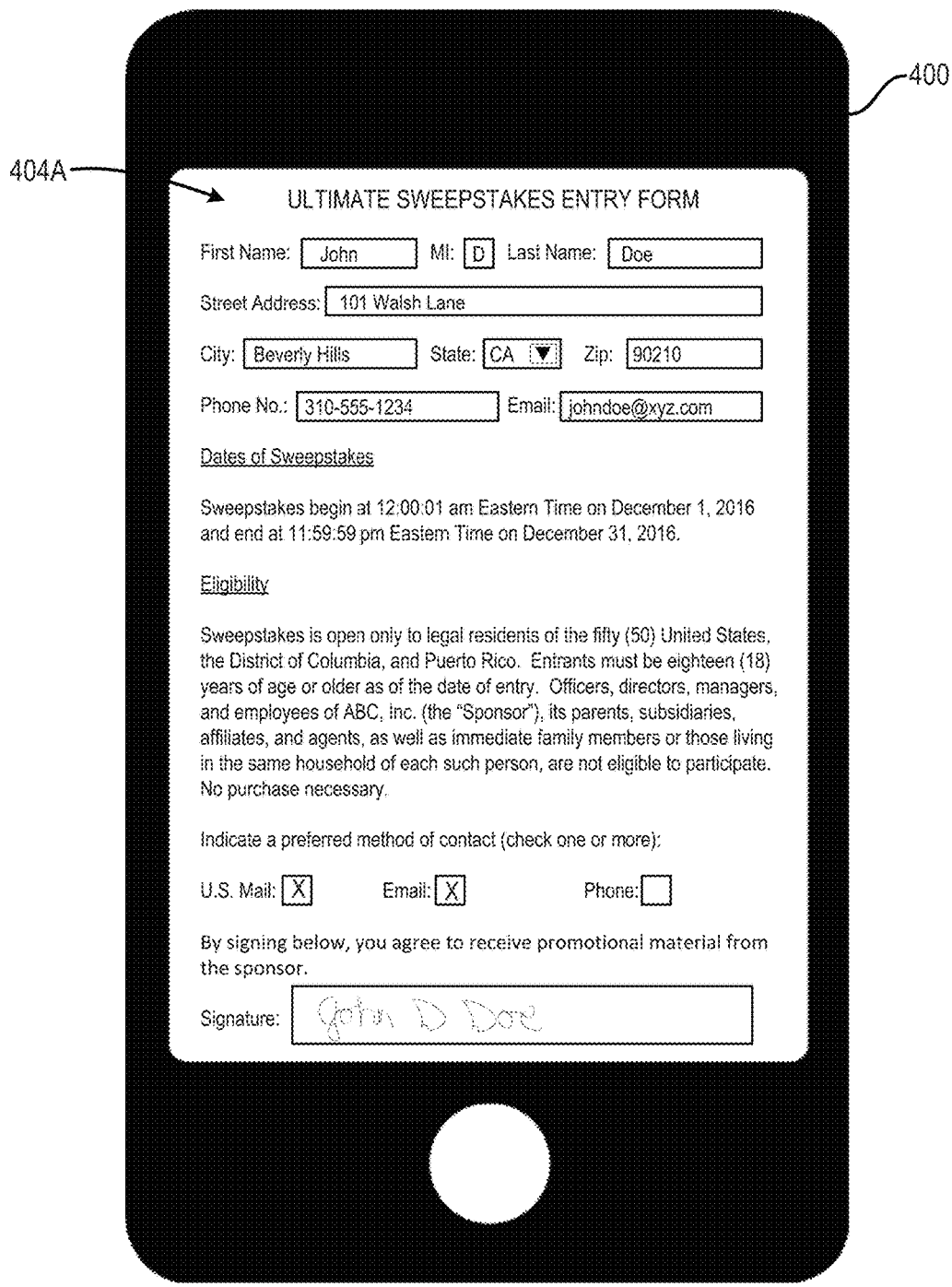
FIG. 6 is an example diagram of a user interface including a touchscreen displaying a completed form document according to an aspect of the present disclosure.

FIG. 6 shows the document 152 of FIG. 4 including the user input that was input by the user in the corresponding form objects 404 on the filtered user interface 500 of FIG. 5.

Figure 7:
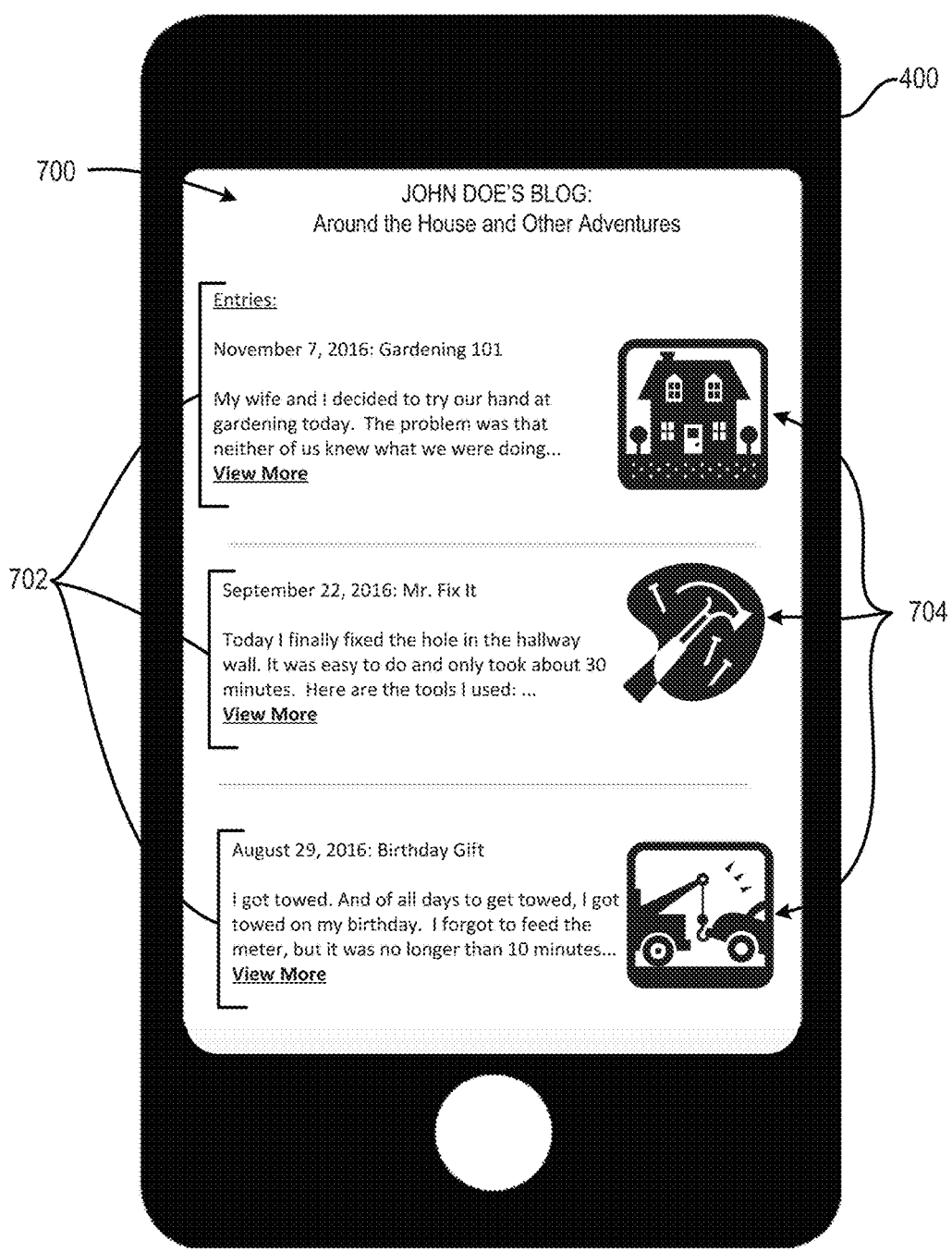
FIG. 7 is an example diagram of a user interface including a touchscreen displaying a document with images according to an aspect of the present disclosure.
Figure 8:
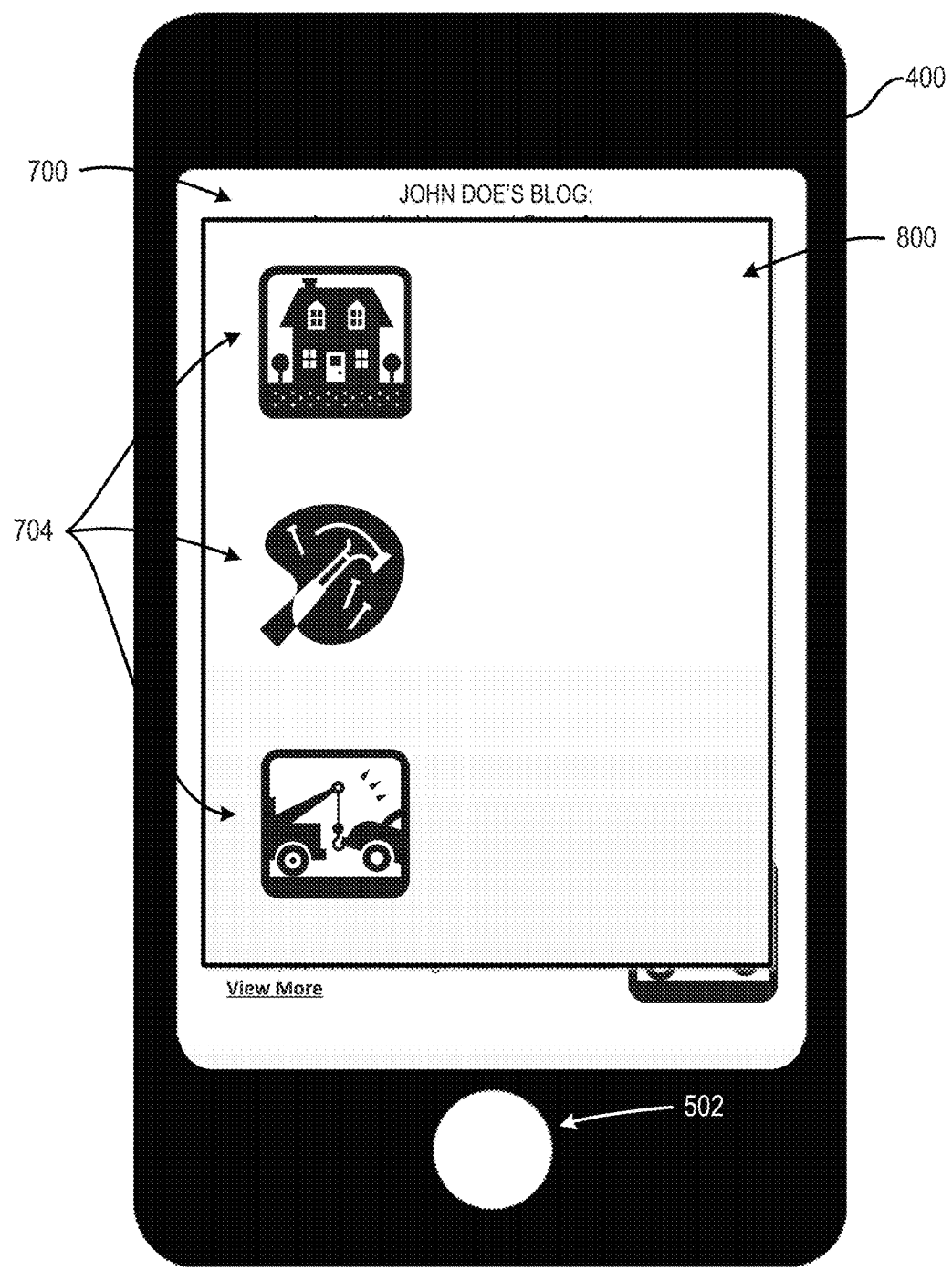
FIG. 8 is an example diagram of a user interface including a touchscreen displaying a filtered user interface with only images from a document according to an aspect of the present disclosure.

FIGS. 7 and 8 show another example of generated a filtered user interface based on a user selection of an object from a document 152. FIG. 7 shows the user device 400 displaying document 700 on the touchscreen 164. The document 700 includes text objects 702 and image objects 704. In one example, a user of the user device 400 contacts the touchscreen at the location of an image object 704 on the document 700. The user contacts the touchscreen with an amount of pressure beyond the pressure threshold described in block 208 to trigger the processor 160 to generate a filtered user interface. The processor 160 generates the filtered user interface to include only the objects having the same type (e.g., the image objects 704).

FIG. 8 shows a filtered user interface 800 including only the image objects 704 of FIG. 4. In some aspects, a user's selection of an image object 704 allows the user to edit the image object 704 (e.g., replace the image of the house with an image of a flowerbed). Upon completing any modifications to the image objects 704, the user can select the button 502 or the visible potion of the document 700 on the touchscreen to return to the document 152, which will have updated image objects 704 based on any modifications of the image objects 704 from the filtered user interface 800.

General Considerations

While the present subject matter has been described in detail with respect to specific aspects thereof, it will be appreciated that those skilled in the art, upon attaining an understanding of the foregoing may readily produce alterations to, variations of, and equivalents to such aspects. Accordingly, it should be understood that the present disclosure has been presented for purposes of example rather than limitation, and does not preclude inclusion of such modifications, variations, or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying," or the like, refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, or steps. Thus, such conditional language is not generally intended to imply that features, elements or steps are in any way required for one or more examples or that one or more examples necessarily include logic for deciding, with or without author input or prompting, whether these features, elements or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for filtering document objects, comprising:
   displaying, on a touchscreen, a document comprising a plurality of document objects, wherein each object of the plurality of document objects corresponds to different portions of the document;
   receiving, from a touchscreen sensor, an electronic touch signal corresponding to contact of the touchscreen by a user of a user device, the touch signal including information associated with the contact;
   determining, by a processor communicatively coupled to the touchscreen sensor, a location of the contact on the touchscreen;
   identifying, by the processor, a form field object of the plurality of document objects that is displayed at the location and within the document displayed on the touchscreen;
   identifying, by the processor, a first set of document objects within the document, each object of the first set of document objects comprising the form field object; and
   generating, by the processor, a filtered user interface by extracting the first set of document objects from a second set of document objects, the second set of document objects including additional objects with object types different from the form field object, wherein the filtered user interface excludes the additional objects, is displayable on the touchscreen, and enables modification of the first set of document objects in the filtered user interface.

2. The computer-implemented method of claim 1, further comprising determining that the contact corresponds to a triggering event that causes the processor to generate the filtered user interface, the triggering event comprising a stored value that is indicative of a predefined method of contacting the touchscreen, and
   wherein the filtered user interface is generated in response to said determination that the contact corresponds to the triggering event.

3. The computer-implemented method of claim 2, wherein said determining that the contact corresponds to the triggering event includes:
   comparing a pressure associated with the contact to a pressure threshold value stored in a storage device accessible to the processor; and
   determining that the pressure is above the pressure threshold value, the pressure threshold value defining a minimum amount of pressure applied to the touchscreen for causing the processor to generate the filtered user interface.

4. The computer-implemented method of claim 2, wherein said determining that the contact corresponds to the triggering event includes:
   comparing pressure associated with the contact to a touch pattern stored in a storage device accessible to the processor; and
   determining that the contact corresponds to the touch pattern, the touch pattern defining one of a number of successive user contacts with the touchscreen or a pattern of the successive user contacts.

5. The computer-implemented method of claim 1, further including displaying the filtered user interface on the touchscreen overlaying the document such that at least a portion of the document is visible on the touchscreen.

6. The computer-implemented method of claim 5, wherein the at least a portion of the document visible on the touchscreen is selectable by the user in response to an additional contact to cause the processor to display additional portions of the document on the touchscreen.

7. The computer-implemented method of claim 5, further comprising:
subsequent to displaying the filtered user interface on the touchscreen, receiving a selection signal corresponding to a selection of a button of the user device; and
in response to receiving the selection signal, displaying the document on the touchscreen, the document including modifications to at least one object of the first set of document objects.

8. The computer-implemented method of claim 1, wherein the object types correspond to image objects, text objects, or annotation objects.

9. A non-transitory computer-readable storage medium storing program code executable by a processor to cause the processor to perform operations for filtering document objects, the operations comprising:
displaying, on a touchscreen, a document comprising a plurality of document objects, wherein each object of the plurality of document objects corresponds to different portions of the document;
receiving, from a touchscreen sensor, an electronic touch signal corresponding to contact of the touchscreen by a user of a user device, the touch signal including information associated with the contact;
determining a location of the contact on the touchscreen;
identifying a form field object of the plurality of document objects that is displayed at the location and within the document displayed on the touchscreen;
identifying a first set of document objects within the document, each object of the first set of document objects comprising the form field object; and
generating a filtered user interface by extracting the first set of document objects from a second set of document objects, the second set of document objects including additional objects with object types different from the form field object, wherein the filtered user interface excludes the additional objects, is displayable on the touchscreen, and enables modification of the first set of document objects in the filtered user interface.

10. The non-transitory computer-readable storage medium of claim 9, the operations further comprising determining that the contact corresponds to a triggering event that causes the processor to generate the filtered user interface, the triggering event comprising a stored value that is indicative of a predefined method of contacting the touchscreen, and
wherein the filtered user interface is generated in response to said determination that the contact corresponds to the triggering event.

11. The non-transitory computer-readable storage medium of claim 10, wherein the operation of determining that the contact corresponds to the triggering event includes:
comparing a pressure associated with the contact to a pressure threshold value stored in a storage device accessible to the processor; and
determining that the pressure is above the pressure threshold value, the pressure threshold value defining a minimum amount of pressure applied to the touchscreen for causing the processor to generate the filtered user interface.

12. The non-transitory computer-readable storage medium of claim 10, wherein the operation of determining that the contact corresponds to the triggering event includes:
comparing pressure associated with the contact to a touch pattern stored in a storage device accessible to the processor; and
determining that the contact corresponds to the touch pattern, the touch pattern defining one of a number of successive user contacts with the touchscreen or a pattern of the successive user contacts.

13. The non-transitory computer-readable storage medium of claim 9, the operations further comprising displaying the filtered user interface on the touchscreen overlaying the document such that at least a portion of the document is visible on the touchscreen.

14. The non-transitory computer-readable storage medium of claim 13, wherein the at least a portion of the document visible on the touchscreen is selectable by the user in response to an additional contact to cause the processor to display additional portions of the document on the touchscreen.

15. The non-transitory computer-readable storage medium of claim 13, the operations further comprising:
subsequent to displaying the filtered user interface on the touchscreen, receiving a selection signal corresponding to a selection of a button of the user device; and
in response to receiving the selection signal, displaying the document on the touchscreen, the document including modifications to at least one object of the first set of document objects.

16. A computing system for filtering document objects, the computing system comprising:
means for displaying, on a touchscreen, a document comprising a plurality of document objects, wherein each object of the plurality of document objects corresponds to different portions of the document;
means for receiving, from a touchscreen sensor, an electronic touch signal corresponding to contact of the touchscreen by a user of a user device, the touch signal including information associated with the contact;
means for determining a location of the contact on the touchscreen;
means for identifying a form field object of the plurality of document objects that is displayed at the location and within the document displayed on the touchscreen;
means for identifying a first set of document objects within the document, each object of the first set of document objects comprising the form field object; and
means for generating a filtered user interface by extracting the first set of document objects from a second set of document objects, the second set of document objects including additional objects with object types different from the form field object, wherein the filtered user interface excludes the additional objects, is displayable on the touchscreen, and enables modification of the first set of document objects in the filtered user interface.

17. The system of claim 16, further comprising:
means for determining that the contact corresponds to a triggering event that causes the processor to generate the filtered user interface, the triggering event comprising a stored value that is indicative of a predefined method of contacting the touchscreen, and
wherein the filtered user interface is generated in response to said determination that the contact corresponds to the triggering event.

18. The system of claim 17, wherein the means for determining that the contact corresponds to the triggering event:
- compares a pressure associated with the contact to a pressure threshold value stored in a storage device accessible to the processor; and
- determines that the pressure is above the pressure threshold value, the pressure threshold value defining a minimum amount of pressure applied to the touchscreen for causing the processor to generate the filtered user interface.

19. The system of claim 17, wherein the means for determining that the contact corresponds to the triggering event:
- compares a pressure associated with the contact to a touch pattern stored in a storage device accessible to the processor; and
- determines that the contact corresponds to the touch pattern, the touch pattern defining one of a number of successive user contacts with the touchscreen or a pattern of the successive user contacts.

20. The system of claim 16, further comprising:
means for displaying the filtered user interface on the touchscreen overlaying the document such that at least a portion of the document is visible on the touchscreen.

* * * * *